(12) United States Patent
Tutzauer et al.

(10) Patent No.: US 7,293,506 B2
(45) Date of Patent: Nov. 13, 2007

(54) STRUCTURAL SYSTEM COMPRISING A TRACK FOR A MAGNETIC LEVITATION TRANSPORT SYSTEM POWERED BY A LINEAR ELECTRIC MOTOR

(75) Inventors: René Tutzauer, La Celle Saint Cloud (FR); Daniel Dutoit, Boulogne (FR)

(73) Assignees: Alstom, Paris (FR); Systra, Paris (FR)

( * ) Notice: Subject to any disclaimer, the term of this patent is extended or adjusted under 35 U.S.C. 154(b) by 0 days.

(21) Appl. No.: 10/850,428

(22) Filed: May 21, 2004

(65) Prior Publication Data
US 2004/0255815 A1   Dec. 23, 2004

(30) Foreign Application Priority Data
May 23, 2003   (FR)   .................................. 03 06280

(51) Int. Cl.
*B61B 12/00*   (2006.01)
(52) U.S. Cl. ...................................... 104/124; 104/125
(58) Field of Classification Search ................ 104/124, 104/125, 126
See application file for complete search history.

(56) References Cited

U.S. PATENT DOCUMENTS 4,690,064 A * 9/1987 Owen ......................... 104/119
5,934,198 A * 8/1999 Fraser ......................... 105/144

FOREIGN PATENT DOCUMENTS

| DE | 21 48 941 | 4/1973 |
|---|---|---|
| DE | 33 35 058 A1 | 4/1985 |
| DE | 196 25 305 A1 | 1/1998 |
| WO | WO 03 013932 A2 | 2/2003 |

\* cited by examiner

*Primary Examiner*—Mark T. Le
(74) *Attorney, Agent, or Firm*—Sughrue Mion, PLLC

(57) ABSTRACT

Structural system comprising a track for a magnetic levitation transport system powered by a linear electric motor. This structural system comprising a track for a magnetic levitation transport system powered by a linear electric motor is notable in that it combines two T-shaped tracks produced in a single U-shaped structure, the vertical bars of the T-shapes and the U-shapes being joined, and the lower slabs of the track-supporting U-shapes contributing to the general strength of the engineering structure, in the absence of lateral screens.

1 Claim, 2 Drawing Sheets

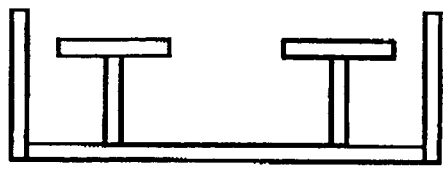
Viaduct and traditional track
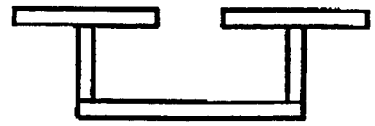
Proposed track
FIG.1
(prior art)
FIG.2
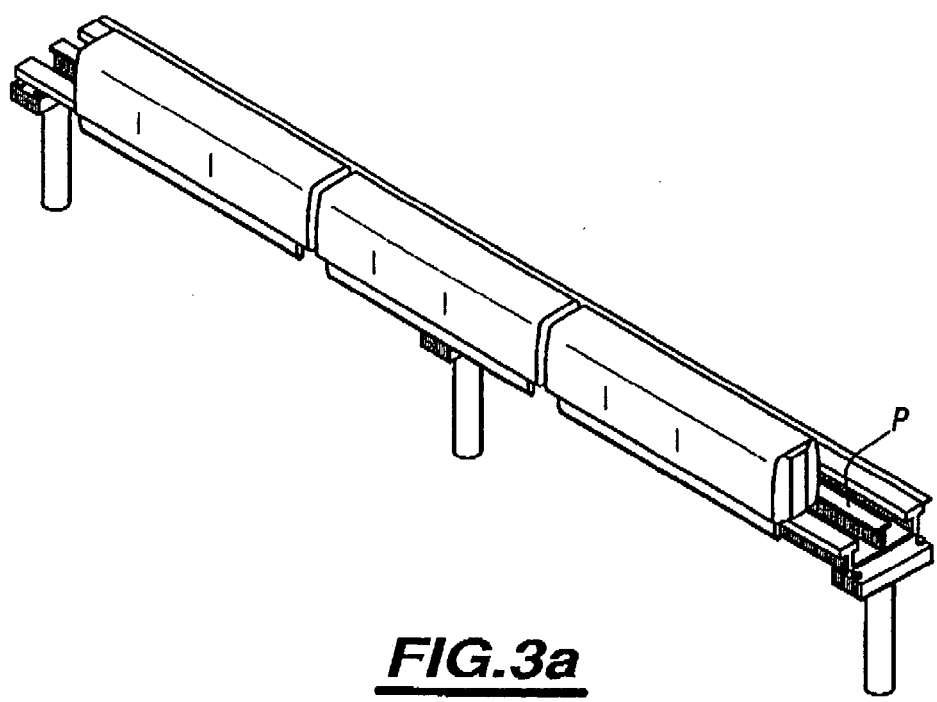
FIG.3a

STRUCTURAL SYSTEM COMPRISING A TRACK FOR A MAGNETIC LEVITATION TRANSPORT SYSTEM POWERED BY A LINEAR ELECTRIC MOTOR

The invention relates to a structural system comprising a track for a magnetic levitation transport system powered by a linear electric motor.

BACKGROUND OF THE INVENTION

Civil engineering structures (viaducts) that are intended to support magnetic levitation vehicle traffic are currently produced from prefabricated segments assembled on site or cast in situ. One or two track structures (the track), placed on sleepers by a pillar and used to adjust and hold the rails, and to transmit stresses to the viaduct, are then positioned on these structures as a superstructure.

Existing viaducts are constructed in order to provide transport track support structures, but never in road structures, and still less in railway structures, the road surface or railway line actually contribute to the strength of the structure under the effect of permanent loads and use.

The structures of existing magnetic levitation transport systems that are powered by a linear electric motor still subscribe to this principle of separating functions and reactions. The track supports the vertical levitation stresses, the lateral guiding stresses and the longitudinal traction/braking stresses, and transmits them to the viaduct.

HSST patent U.S. Pat. No. 5,152,227, filed in the United States, sets out provisions for construction that do not relate to the incorporation of that which appears to be the track into the composition of the engineering structure, and neither concerns nor mentions this particularity. A document of this type does not indicate how the track is to be incorporated into the viaduct as a whole.

The, generally pneumatic, support structures of monorails driven by wheel friction have a structure that performs the role both of the track and of the viaduct.

The HSST engineering structure produced in Japan is configured without any lateral screens, but its track is configured in two portions, one comprising sleepers and rails, which serve merely to transfer stresses to the body of the viaduct, and the other comprising the body of the viaduct, incorporating the element that withstands the stresses exerted by the sleepers.

The object of the invention is to propose means for simplifying and optimising design, for making lighter structures, for facilitating construction and for reducing ground supports, and a structural system comprising a track for a magnetic levitation transport system powered by a linear electric motor.

BRIEF SUMMARY OF THE INVENTION

According to the invention, the civil engineering structure comprising two tracks for a magnetic levitation transport system powered by a linear electric motor is notable in that it combines at least two generally T-shaped track supports, connected to each other to form a generally U- or V-shaped structure, the vertical bars of the generally T-shaped track supports forming the vertical bars of the generally U- or V-shaped structure, said generally U- or V-shaped structure forming a single-piece structure that is linearly continuous in the direction of the tracks, such that the base of the generally U- or V-shaped single-piece structure contributes to the general strength of said civil engineering structure.

Furthermore, the civil engineering structure according to the invention incorporates a sequence of longitudinally spaced pylons supporting said generally U- or V-shaped structure.

Finally, the civil engineering structure according to the invention is notable in that the generally T-shaped supports are both a component of the track and an integral part of the structure, so as to transfer loads onto the piers.

BRIEF DESCRIPTION OF THE DRAWINGS

A better understanding of the invention will be facilitated by the description and drawings, in which, in addition to FIG. 1, showing a cross-section of a structure or structural system of the prior art, FIG. 2 shows a cross-section of the structural system according to the invention;

FIG. 3a shows, as an illustrative example, a magnetic levitation train using a structural system in accordance with the object of the present invention;

DETAILED DESCRIPTION OF THE INVENTION

The invention consists, in the envisaged application, in completely combining the two structures, the viaduct, the tracks and supports thereof, into a single structure. This structure has the following characteristics:

It combines at least two T-shaped track supports, connected in a single U or V-shaped structure, the viaduct, wherein the vertical bars of the Ts and those of the U or V are joined.

The two tracks supports and the base of the single U or V-shaped structure are not interrupted along the track, so as to contribute to the general strength of the structure.

The engineering structure thus consists of a single longitudinal structure, which is also used with the highmost interest to transfer stresses onto the piers supporting the engineering structure.

The width of the engineering structure is kept to the minimum required to enable it to support the reaction and levitation rails, and to provide sufficient safety distances between the tracks to enable vehicles to cross, and optionally to allow a central emergency and maintenance bridge or walkway to be installed.

The elements of the engineering structure are cast in situ or prefabricated in a factory, before being transported to be assembled on site, as a function of the profile defined for the transport line to be produced.

The prefabricated elements are equipped, on the faces located at the interface with the reaction rails, with devices allowing these rails to be fitted, adjusted and fixed in accordance with the profile of the line.

Figure 3B:
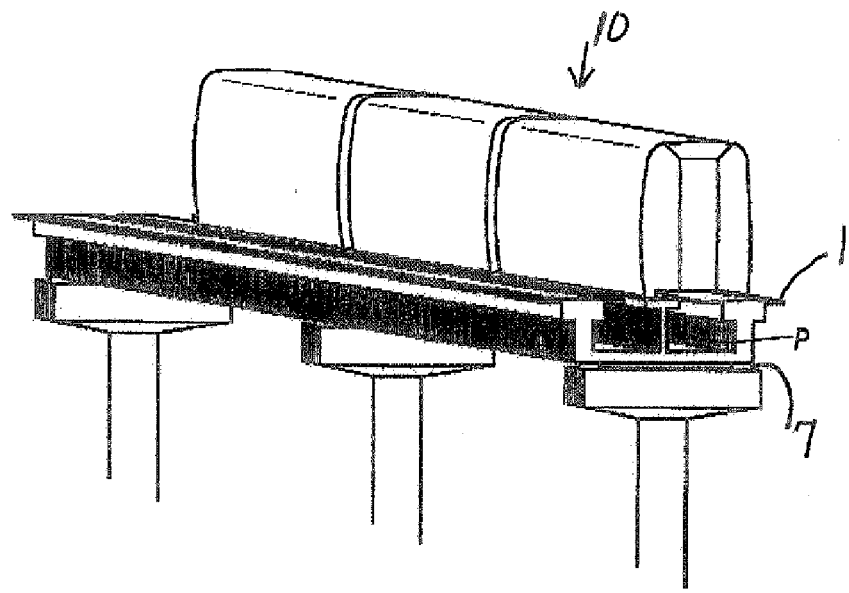
FIG. 3b shows, as an illustrative example, a part view of FIG. 3a in which the relative position of the magnetic levitation train and the structural system are represented
Figure 3C:
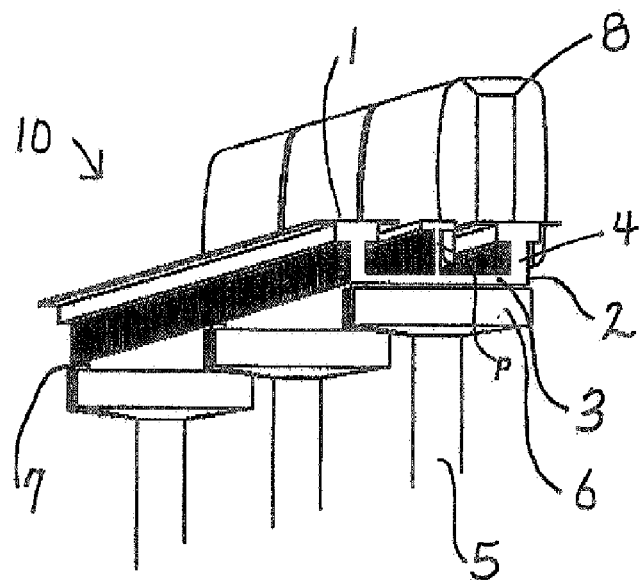
FIG. 3c shows a detail of FIG. 3b.

FIGS. 3a to 3c show the relative position of a magnetic levitation train using a structural system of a single structure in accordance with the object of the invention.

As shown by these figures the structural system comprising a track can advantageously be equipped with a central emergency or maintenance walkway platform P, adapted to access to the cars of the train or for passengers to leave them respectively if necessary. The central walkway platform P can be located at the central part of the single U or V shaped structure, at least on specific parts of the structural system comprising a track. The walkway can advantageously be integral with the structure.

As shown in FIGS. 3b-3c, magnetic levitation transport system 10 includes two tracks 1 extending in a longitudinal direction, and generally U-shaped structure 2. The U-shaped structure has base 3 and two generally T-shaped track supports, which form vertical bars 4 of the generally U-shaped structure, and are joined by base 3. The base has a length, a width and a thickness. The transport system further includes a sequence of longitudinally spaced piers 5 and cross beams 6 for supporting the generally U-shaped structure. Each of the crossbeams has a length substantially the same as the width of base 3. Between crossbeams 6 and the U-shaped shaped structure, there are intermediate elements 7 located on tops of both ends of cross beams 6. The transport system also includes magnetic levitation vehicle 8 substantially centered on each of the T-shaped track supports, such that a vertical plane extending parallel to the longitudinal axis of one of tracks 1 would essentially pass through the longitudinal axis of vehicle 8, the longitudinal axis of vertical bars 4 and through intermediate elements 7.

This has the advantages that construction is simplified, the engineering structure and the track are easier to place, and the structure, including the ground supports, is generally lighter.

For this purpose, the rail supports must be placed, in the factory, in the mould of each prefabricated element.

The element ends must be pre-oriented toward production in the factory, which means that customised elements are awkward to produce.

The variation in which a joint that may be adjusted on site is used eliminates this drawback, but inevitably represents a more expensive solution.

The invention claimed is:

1. A magnetic levitation transport system comprising:
   two tracks extending in a longitudinal direction;
   a generally U-shaped structure comprising a base and two generally T-shaped track supports having vertical bars which form vertical bars of the generally U-shaped structure joined by the base that has a length, a width and a thickness;
   a sequence of longitudinally spaced piers having cross beams supporting said generally U-shaped structure, said cross beams having a length substantially the same as the width of said base, and intermediate elements located on tops of both ends of the cross beams; and
   a magnetic levitation vehicle substantially centered on each of said T-shaped track supports, such that a vertical plane extending parallel to the longitudinal axis of one of said tracks would essentially pass through the longitudinal axis of said vehicle, the longitudinal axis of said vertical bars and through the intermediate elements.

* * * * *